(12) United States Patent
Gordon et al.

(10) Patent No.: US 11,106,710 B2
(45) Date of Patent: Aug. 31, 2021

(54) DISPLAYING ANSWERS IN ACCORDANCE WITH ANSWER CLASSIFICATIONS

(71) Applicant: International Business Machines Corporation, Armonk, NY (US)

(72) Inventors: John B. Gordon, Austin, TX (US); Scott H. Isensee, Austin, TX (US); Mark Marrara, Round Rock, TX (US); William G. O'Keeffe, Tewksbury, MA (US); Cale Vardy, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 16/113,384

(22) Filed: Aug. 27, 2018

(65) Prior Publication Data

US 2019/0012372 A1     Jan. 10, 2019

Related U.S. Application Data

(63) Continuation of application No. 14/564,912, filed on Dec. 9, 2014, now Pat. No. 10,061,842.

(51) Int. Cl.
*G06F 16/335* (2019.01)
*G06F 16/332* (2019.01)
*G06F 16/9535* (2019.01)

(52) U.S. Cl.
CPC ...... *G06F 16/3329* (2019.01); *G06F 16/9535* (2019.01)

(58) Field of Classification Search
CPC .. G06F 16/3329; G06F 16/335; G06F 16/337; G06F 16/338; G06F 16/9535
See application file for complete search history.

(56) References Cited

U.S. PATENT DOCUMENTS 4,965,763 A    10/1990  Zamora
5,115,501 A *   5/1992  Kerr .................. G06F 9/453
(Continued)

FOREIGN PATENT DOCUMENTS

GB      2468203      9/2010
WO    2005017656    2/2005
(Continued)

OTHER PUBLICATIONS

"U.S. Appl. No. 14/495,717 FAI—OA Summary", dated Mar. 16, 2017, 7 pages.
(Continued)

*Primary Examiner* — Dino Kujundzic
(74) *Attorney, Agent, or Firm* — Jamar K. Ray (57) ABSTRACT

A user session for a client device may be initiated by a computerized answering system. Answers to one or more questions may be provided via a network for presentation in a user interface of a display of the client device, where the presentation of the answers may be based on a default profile. User interaction with one or more of the answers presented in the user interface of the display of the client device is monitored during the user session. A first user profile is selected from a plurality of user profiles in response to determining attributes of the user interaction correspond to attributes of the first user profile. The user interface of the display of the client device is modified to change from presenting the answers based on the default profile to presenting the answers based on the first user profile.

15 Claims, 5 Drawing Sheets

(56) References Cited

U.S. PATENT DOCUMENTS

| | | | |
|---|---|---|---|
| 5,930,746 | A | 7/1999 | Ting |
| 7,542,894 | B2 | 6/2009 | Murata |
| 7,809,664 | B2 | 10/2010 | Heck |
| 7,953,720 | B1 | 5/2011 | Rohde et al. |
| 8,055,603 | B2 | 11/2011 | Angell et al. |
| 8,266,072 | B2 | 9/2012 | Grace et al. |
| 8,280,885 | B2 | 10/2012 | Cardie et al. |
| 8,370,278 | B2 | 2/2013 | Vadlamani et al. |
| 8,380,696 | B1 | 2/2013 | Rogers et al. |
| 8,417,514 | B2 | 4/2013 | Brown et al. |
| 8,438,054 | B2 | 5/2013 | Lowrance et al. |
| 8,443,189 | B2 | 5/2013 | Li et al. |
| 8,457,928 | B2 | 6/2013 | Dang et al. |
| 8,539,404 | B2 | 9/2013 | Craig et al. |
| 8,601,030 | B2 | 12/2013 | Bagchi et al. |
| 8,639,508 | B2 | 1/2014 | Zhao et al. |
| 8,683,379 | B2* | 3/2014 | LuVogt ............... G06F 16/9577 715/788 |
| 8,819,007 | B2 | 8/2014 | Brown et al. |
| 8,832,064 | B2 | 9/2014 | Stenchikova et al. |
| 9,400,841 | B2 | 7/2016 | Eggebraaten et al. |
| 9,946,747 | B2 | 4/2018 | Barker et al. |
| 10,802,839 | B2* | 10/2020 | Movsisyan ............. G06F 9/451 |
| 2002/0093529 | A1* | 7/2002 | Daoud ............... G06F 16/9535 715/745 |
| 2002/0156793 | A1 | 10/2002 | Jaro |
| 2003/0090515 | A1* | 5/2003 | Chang ................... H04N 21/47 715/745 |
| 2005/0010444 | A1 | 1/2005 | Iliff |
| 2007/0172808 | A1 | 7/2007 | Capone |
| 2007/0219795 | A1 | 9/2007 | Park et al. |
| 2007/0294615 | A1* | 12/2007 | Sathe .................. G06F 16/9535 707/803 |
| 2008/0032277 | A1 | 2/2008 | Maggio et al. |
| 2008/0104065 | A1 | 5/2008 | Agarwal et al. |
| 2008/0154581 | A1 | 6/2008 | Lavi et al. |
| 2008/0221923 | A1 | 9/2008 | Shogan |
| 2009/0007924 | A1 | 1/2009 | Iliff |
| 2009/0070311 | A1 | 3/2009 | Feng |
| 2009/0162824 | A1 | 6/2009 | Heck |
| 2010/0049679 | A1 | 2/2010 | Phillips et al. |
| 2010/0312650 | A1* | 12/2010 | Pinckney ............ G06F 16/9535 705/14.66 |
| 2011/0029946 | A1 | 2/2011 | Joukov et al. |
| 2011/0055189 | A1* | 3/2011 | Effrat .................. G06F 16/9535 707/706 |
| 2011/0106731 | A1 | 5/2011 | Pearson et al. |
| 2011/0125734 | A1 | 5/2011 | Duboue et al. |
| 2011/0125783 | A1* | 5/2011 | Whale ..................... G06F 16/93 707/769 |
| 2012/0078837 | A1 | 3/2012 | Bagchi et al. |
| 2012/0102193 | A1 | 4/2012 | Rathore et al. |
| 2012/0301864 | A1 | 11/2012 | Bagchi et al. |
| 2012/0311025 | A1 | 12/2012 | Garcia Aranda |
| 2012/0331391 | A1 | 12/2012 | Kanjirathinkal et al. |
| 2013/0029307 | A1 | 1/2013 | Ni et al. |
| 2013/0114694 | A1 | 5/2013 | Chen et al. |
| 2013/0117024 | A1 | 5/2013 | Glass et al. |
| 2013/0262501 | A1 | 10/2013 | Kuchmann-Beauger et al. |
| 2014/0006012 | A1 | 1/2014 | Zhou et al. |
| 2014/0006016 | A1 | 1/2014 | Malov et al. |
| 2014/0019443 | A1 | 1/2014 | Golshan |
| 2014/0032277 | A1 | 1/2014 | Kashyap |
| 2014/0058986 | A1 | 2/2014 | Boss et al. |
| 2014/0101260 | A1 | 4/2014 | Langen et al. |
| 2014/0164303 | A1 | 6/2014 | Bagchi et al. |
| 2014/0188462 | A1 | 7/2014 | Zadeh |
| 2014/0201126 | A1 | 7/2014 | Zadeh et al. |
| 2014/0229161 | A1 | 8/2014 | Gliozzo |
| 2014/0229163 | A1 | 8/2014 | Gliozzo |
| 2014/0272909 | A1 | 9/2014 | Isensee et al. |
| 2014/0337329 | A1 | 11/2014 | Brown et al. |
| 2014/0351228 | A1 | 11/2014 | Yamamoto |
| 2015/0026106 | A1 | 1/2015 | Oh et al. |
| 2015/0074095 | A1 | 3/2015 | Enders et al. |
| 2015/0324543 | A1 | 11/2015 | List et al. |
| 2016/0085843 | A1 | 3/2016 | Clark et al. |
| 2016/0085855 | A1 | 3/2016 | Clark et al. |
| 2016/0085857 | A1 | 3/2016 | Clark et al. |
| 2016/0124951 | A1 | 5/2016 | Barker et al. |
| 2016/0124963 | A1 | 5/2016 | Barker et al. |
| 2016/0125063 | A1 | 5/2016 | Barker et al. |
| 2016/0125064 | A1 | 5/2016 | Barker et al. |
| 2016/0125750 | A1 | 5/2016 | Barker et al. |
| 2016/0162790 | A1 | 6/2016 | Gordon et al. |
| 2016/0179317 | A1* | 6/2016 | Karthikeyan ......... H04L 67/306 715/765 |
| 2019/0179875 | A1* | 6/2019 | Lowery .............. G06Q 20/4014 |

FOREIGN PATENT DOCUMENTS

| | | |
|---|---|---|
| WO | 2007100518 | 9/2007 |
| WO | 2009007686 | 1/2009 |
| WO | 2012122196 | 9/2012 |

OTHER PUBLICATIONS

"U.S. Appl. No. 14/495,717 FAI—PreInterview Commun.", filed Oct. 6, 2016, 6 pages.
"U.S. Appl. No. 14/495,717 Final Office Action", dated Jul. 26, 2017, 20 pages.
"U.S. Appl. No. 14/507,683 Final Office Action", dated Sep. 22, 2017, 45 pages.
"U.S. Appl. No. 14/564,912 FAI—Office Action Summary", dated Apr. 12, 2016, 7 pages.
"U.S. Appl. No. 14/564,912 Final Office Action", dated Nov. 17, 2016, 17 pages.
"U.S. Appl. No. 14/564,912 Office Action", dated Aug. 14, 2017, 19 pages.
"U.S. Appl. No. 14/570,491 Final Office Action", dated Sep. 11, 2017, 27 pages.
"U.S. Appl. No. 14/570,491 Office Action", dated Feb. 21, 2017, 15 pages.
"U.S. Appl. No. 14/570,683 Office Action", dated Jan. 22, 2018, 25 pages.
"U.S. Appl. No. 14/570,683 Office Action", dated Apr. 19, 2017, 21 pages.
"U.S. Appl. No. 14/663,988 Final Office Action", dated Oct. 19, 2017, 55 pages.
"U.S. Appl. No. 14/663,988 Office Action", dated Jan. 22, 2018, 28 pages.
"U.S. Appl. No. 14/663,988 Office Action", dated Jul. 13, 2017, 34 pages.
"U.S. Appl. No. 14/708,536 Office Action", dated Aug. 23, 2017, 7 pages.
Barker, et al., "U.S. Appl. No. 62/075,635", filed Nov. 5, 2014.
Barker, "U.S. Appl. No. 14/570,491", filed Dec. 15, 2014.
Barker, et al., "U.S. Appl. No. 14/570,683", filed Dec. 15, 2014.
Barker, et al., "U.S. Appl. No. 14/570,797", filed Dec. 15, 2014.
Cairns, et al., "The MiPACQ Clinical Question Answering System", AMIA Annual Symposium Proceedings, 2011, 10 pages.
Chen, et al., "An RNN-Based Prosodic Information Synthesizer for Mandarin Text-to-Speech", 2014 IEEE International Conference on Semantic Computing (ICSC), Jun. 2014, pp. 23-27. DOI: 10.1109/ICS.2014.44, May 1998, 14 Pages.
Chen, "Parameterized Spatial SQL Translation for Geographic Question Answering", 2014 IEEE International Conference on Semantic Computing (ICSC), Jun. 2014, pp. 23-27. DOI: 10.1109/ICS.2014.44, Jun. 2014, 5 Pages.
Clark, "U.S. Appl. No. 14/495,061", filed Sep. 24, 2014.
Clark, "U.S. Appl. No. 14/495,088", filed Sep. 24, 2014.
Clark, et al., "U.S. Appl. No. 14/495,717", filed Sep. 24, 2014.
Eggebraaten, et al., "U.S. Appl. No. 14/570,456", filed Dec. 15, 2014.
Figueroa, et al., "Category-specific Models for Ranking Effective Paraphrases in Community Question Answering", Preprint submitted to Elsevier, Feb. 12, 2014, (Subsequently published in Expert (56) References Cited

OTHER PUBLICATIONS

Systems With Applications, vol. 41, Issue 10, 2014, 10.1016/j.eswa. 2014.02.004)., Feb. 12, 2014, 26 Pages.

Gondek, et al., "A framework for merging and ranking of answers in DeepQA", IBM J. Res. & Dev. vol. 56 No. 3/4 Paper 14 May/Jul. 2012, 2012, pp. 14:1-14:12.

High, et al., "Expert Cancer Care May Soon Be Everywhere, Thanks to Watson", Mind Guest Blog, Scientific American, Oct. 20, 2014. http://blogs.scientificamerican.com/mind-guest-blog/2014/10/20/expert-cancer-care-may-soon-be-everywhere-thanks-to-watson/, Oct. 20, 2014, 4 Pages.

Hovy, et al., "A Question/Answer Typology with Surface Text Patterns", Proceedings of HLT 2002, Second International Conference on Human Language Technology Research, 2002, pp. 247-251, Morgan Kaufmann Publishers Inc © 2002., 2002, 5 Pages.

Jijkoun, et al., "Answer Selection in a Multi-Stream Open Domain Question Answering System", Advances in Information Retrieval, vol. 2997 of the series Lecture Notes in Computer Science, 2004, 13 pages.

Li, et al., "Graph-based Answer Passage Ranking for Question Answering", 2010 International Conference on Computational Intelligence and Security (CIS), Dec. 2010, pp. 634-638, © 2010 IEEE DOI: 10.1109/CIS.2010.144, 2010, 5 Pages.

Matsuda, et al., "Synthesis of Multiple Answer Evaluation Measures using a Machine Learning Technique for a QA System", Proceedings of NTCIR-5 Workshop Meeting, Dec. 6-9, Tokyo, Japan, 2005, 7 pages.

Oh, et al., "Enhancing Performance with a Learnable Strategy for Multiple Question Answering Modules", ETRI Journal vol. 31 No. 4, Aug. 2009, 10 pages.

Unknown, "Jenks natural breaks optimization", Wikipedia, http://en.wikipedia.org/wiki/Jenks_natural_breaks_optimization, Dec. 11, 2014, 2 Pages.

Wu, et al., "Personalized Intelligent Question Answering Algorithm in E-Learning", Proceedings of the Fourth International Conference on Machine Learning and Cybernetics, Guangzhou, Aug. 2005, vol. 6, pp. 3299-3303, © 2005 IEEE. DOI: 10.1109/ICMLC.2005. 1527512, Aug. 2005, 5 Pages.

Zhou, et al., "Group Non-negative Matrix Factorization with Natural Categories for Question Retrieval in Community Question Answer Archives", Proceedings of Coling 2014, the 25th International Conference on Computational Linguistics: Techinical Papers, pp. 89-98, Ireland, Aug. 2014., Aug. 2014, 10 Pages.

Zou, "Design, Implementation of the Parallel C Language Based on C/S Mode in Distributed Systems", 2011 International Conference on Transportation, Mechanical, and Electrical Engineering (TMEE), Dec. 2011, pp. 532-535, © 2011 IEEE. DOI: 10.1109/TMEE.2011. 6199258, Dec. 2011, 4 Pages.

List of IBM Patents or Applications Treated as Related.

\* cited by examiner

FIG. 5

DISPLAYING ANSWERS IN ACCORDANCE WITH ANSWER CLASSIFICATIONS

RELATED APPLICATIONS

This application is a Continuation of and claims the priority benefit of U.S. application Ser. No. 14/564,912 filed on Dec. 9, 2014.

BACKGROUND

Embodiments of the inventive subject matter generally relate to the field of computer systems, and, more particularly, to the use of user behavior data to facilitate in the operation of a question answering system.

SUMMARY

Embodiments generally include a method for providing answers in a computerized answering system to client devices of a network. The method may include initiating, by a processor of the computerized answering system, a user session for a client device. The method may further include providing, by a network interface of the computerized answering system via the network, answers to one or more questions for presentation in a user interface of a display of the client device, where the presentation of the answers may be based on a default profile. The method may further include monitoring, by the processor, user interaction with one or more of the answers presented in the user interface of the display of the client device during the user session. The method may further include selecting, by the processor, a first user profile from a plurality of user profiles in response to determining attributes of the user interaction correspond to attributes of the first user profile. The method may further include modifying, by the processor, the user interface of the display of the client device to change from presenting the answers based on the default profile to presenting the answers based on the first user profile.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to classifying answers using associated answer confidence values, answers may be classified using other criteria such as a user rating for an answer, whether an answer is known to be good, or the amount of evidence for an answer. In other instances, well-known instruction instances, protocols, structures and techniques have not been shown in detail in order not to obfuscate the description.

A question answering ("QA") system allows a user to submit a question for answering. The QA system generally returns a number of possible answers that are displayed to a user. The manner in which the answers are displayed is typically predetermined by a QA system interface. For example, the interface may be configured to display only the top five answers based on associated answer confidence values determined by the QA system or may be configured to display all returned answers. A predetermined, static interface limits the ability of the QA system to accommodate specific users or applications. For instance, in some applications of a QA system, it may be suitable to display only the top answer or to also display supporting evidence supplied by the QA system along with the returned answer. For such situations, the QA system can utilize user behavior data to determine how to adjust the interface. As an example, in one application, users may consistently rank answers with confidence values above 80 on a scale of 0-100 as being correct or useful answers. The QA system could use this user behavior data to modify the interface for that application to display only a single top answer when there is a returned answer with a confidence value greater than 80. In another example, a specific user may consistently click to view the supporting evidence for a returned answer. The QA system could modify the interface to fit the specific user's behavior and always display supporting evidence for a returned answer automatically. In this way, the QA system can dynamically configure the interface in response to specific user behavior.

Figure 1:
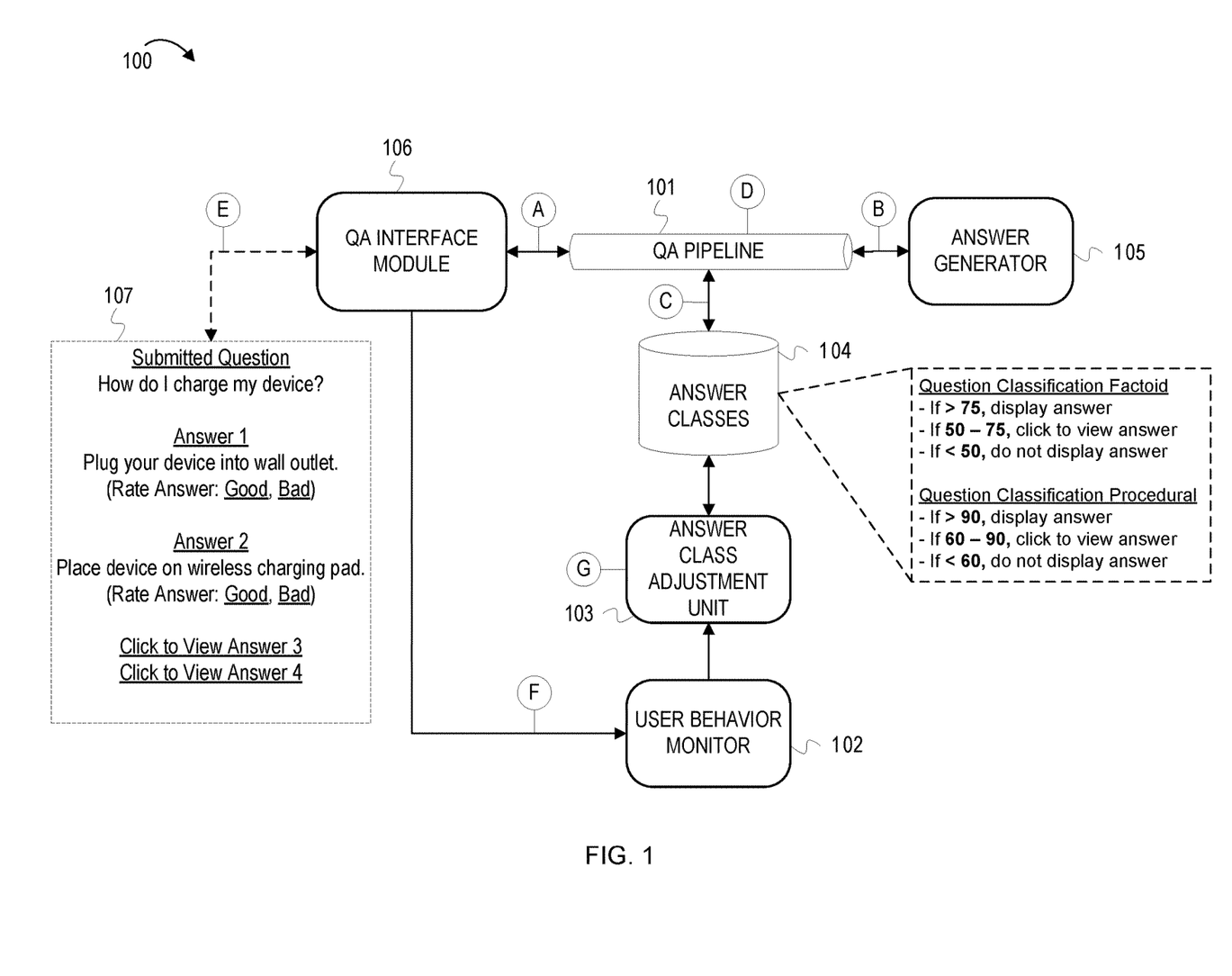
FIG. 1 is a conceptual diagram illustrating a QA system that analyzes user behavior to determine adjustments for answer classes in a QA pipeline.

FIG. 1 is a conceptual diagram illustrating a QA system that analyzes user behavior to determine adjustments for answer classes in a QA pipeline. FIG. 1 depicts a QA system 100 that includes a QA pipeline 101, a user behavior monitor 102, an answer class adjustment unit 103, an answer generator 105, and a QA interface module 106. The QA pipeline 101 and the answer class adjustment unit 103 communicate with an answer class database 104. QA interface module 106 outputs a sample user interface 107. FIG. 1 depicts a series of stages A-G. These stages illustrate example operations and should not be used to limit scope of any claims.

At stage A, the QA pipeline 101 ("pipeline 101") receives a question from the QA interface module 106 ("interface module 106"). The interface module 106 receives the question through the user interface 107. The user interface 107 may be displayed within an application or web browser on a computer, mobile phone, or other client device and allows a user to submit a question by inputting text, selecting a question from a list, using voice recognition, or other input method. The interface module 106 may be located remotely on a server or locally on a client device. The interface module 106 controls how data is displayed in the user interface 107 and manages input to the QA system 100 that is received from a number of user interfaces 107. The pipeline 101 serves as a central hub that connects modules of the QA system 100. The pipeline 101 may collect and organize data, such as answers, confidence values, and thresholds, from different modules to send to the interface module 106. The QA system 100 might contain multiple QA pipelines that each correspond to a specific subject matter or corpus of documents. For example, if the pipeline 101 is designed for use in the medical industry, the pipeline 101 may direct questions to a corpus of documents relating to medicine. Additionally, since accuracy is important in a medical setting, the pipeline 101 may be configured to only return answers with a high confidence value. After receiving the question, the pipeline 101 sends the question to the answer generator 105.

At stage B, the answer generator 105 returns answers to the pipeline 101. The answer generator 105 generates a set of possible answers and corresponding confidence values to the question and then sends them to the QA pipeline 101. Answers may be generated by using information retrieval techniques. For example, the answer generator 105 may perform natural language processing on the question and then search a corpus of documents that has been ingested into the QA system 100. The answer generator 105 may identify one or more answers within the corpus for a given question. Each answer is associated with an answer confidence score that is typically within a scale of 0-100. Once determined the answers and confidence values are sent to the QA pipeline 101.

At stage C, the pipeline 101 retrieves thresholds from the answer class database 104 ("class database 104"). The class database 104 contains a number of thresholds for questions with different attributes. The pipeline 101 identifies question attributes by performing natural language processing on the question. Question attributes include the question classification, the lexical answer type ("LAT"), and the focus. A question classification may indicate the answer type of a question such as factoid, procedural, etc. The LAT may be a word in the question that indicates the type of answer being asked for, and the focus of the question is a reference to the answer. For example, the question "who was the first man on the moon?" would have a question classification of factoid, have a LAT of "man," and have a focus of "who." Additional question attributes may include qualifiers, quantifiers, cardinals, ordinals, etc. Different classes may be determined for each question with a unique attribute set. For example, as depicted in FIG. 1, the class database 104 contains classes for questions with a question classification factoid and a question classification procedural. The class database 104 may also contain classes for more specific question attributes. For example, classes may exist for a question with the attribute set of a question classification factoid, a LAT "person," and a focus "where." After identifying the question attributes, the pipeline 101 can retrieve the corresponding classes from the class database 104 using the attribute set.

At stage D, the pipeline 101 organizes the answers received from the answer generator 105. The pipeline 101 organizes the answers based on the thresholds of classes retrieved from the class database 104 at stage C. Classes have thresholds that indicate which answers should be classified in the class based on the answers' confidence values. Additionally, the class contains rules for how to display answers in the class. For example, a class may have a threshold of "if <50" and a rule of "do not display answer," which would cause the pipeline 101 to classify answers with confidence values of less than 50 into the class and cause the interface module 106 to prevent the answer in the class from being displayed in the interface 107. The pipeline 101 compares answer confidence values to the class thresholds to classify the answers into classes. The pipeline 101 may also be configured to classify answers based on other criteria such as a user rating for an answer. Once the answers have been classified, the answers are sent in their classes to the interface module 106.

At stage E, the interface module 106 outputs the answers to be displayed on the user interface 107. The interface module 106 determines how the answers should be displayed based on the class and adjusts the user interface 107 accordingly. For example, as depicted in FIG. 1, the question "how do I charge my device?" has a question classification of procedural, so the classes that are retrieved from the class database 104 are "if >90, display answer," "if 60-90, click to view answer," and "if <60, do not display answer." Based on the classes, the interface module 106 modifies the user interface 107 so that the answers in the first class are displayed, the answers in the second class are available to view if clicked, and the answers in the third class are not displayed. Once a new question is submitted, the interface module 106 will again modify the user interface 107 to display answers according to new classes.

At stage F, the user behavior monitor 102 ("monitor 102") receives user behavior data through the interface module 106. The user interface 107 allows a user to rank an answer and submit that ranking to the QA system 100 through the interface module 106. For example, as depicted in FIG. 1, a user may click below an answer to rate the answer as "good" or "bad." More complex interfaces may also allow a user to rank an answer on a scale or submit comments about an answer. The monitor 102 tracks user responses to answers and determines whether a certain answer is receiving a positive or negative user response. As depicted in FIG. 1, the monitor 102 tracks whether the ranking for a specific answer is "good" or "bad" to determine a positive or negative response. If no ranking is submitted, the monitor 102 may also determine, for example, that the response to "Answer 1" and "Answer 2" is negative if a user clicks to view "Answer 3" or "Answer 4." In some embodiments, the monitor 102 may perform language processing on user comments for an answer to determine a response. Once determined, the user response data is sent to the answer class adjustment unit 103 ("adjustment unit 103").

At stage G, the adjustment unit 103 determines whether to adjust the classes. The adjustment unit 103 analyzes the user response data received from the monitor 102 to determine whether an adjustment is necessary. An adjustment may be necessary if an answer within a certain class is receiving one or more positive or negative user responses. For example, as depicted in FIG. 1, "Answer 3" has been placed according to its confidence value into the class for question classification procedural of "if 60-90, click to view answer." If "Answer 3" has received a number of positive responses, then the adjustment unit 103 will determine that "Answer 3" should be displayed automatically and will adjust the class threshold of "if >90, display answer" to include "Answer 3." If, for example, "Answer 3" has a confidence value of 85, the class threshold may be adjusted to "if >=85, display answer." Similarly, if "Answer 2" is receiving a number of negative responses, the adjustment unit 103 may adjust the class threshold for question classification procedural of "if >90, display answer" to exclude answers with confidence values equal to or below the confidence value of "Answer 2." If determined that a class adjustment is needed, the adjustment unit 103 will adjust the classes and store the adjusted classes in the class database 104 for future use by the pipeline 101. The adjustment unit 103 may continue to adjust the classes as more questions are asked and additional user response data is determined.

Figure 2:
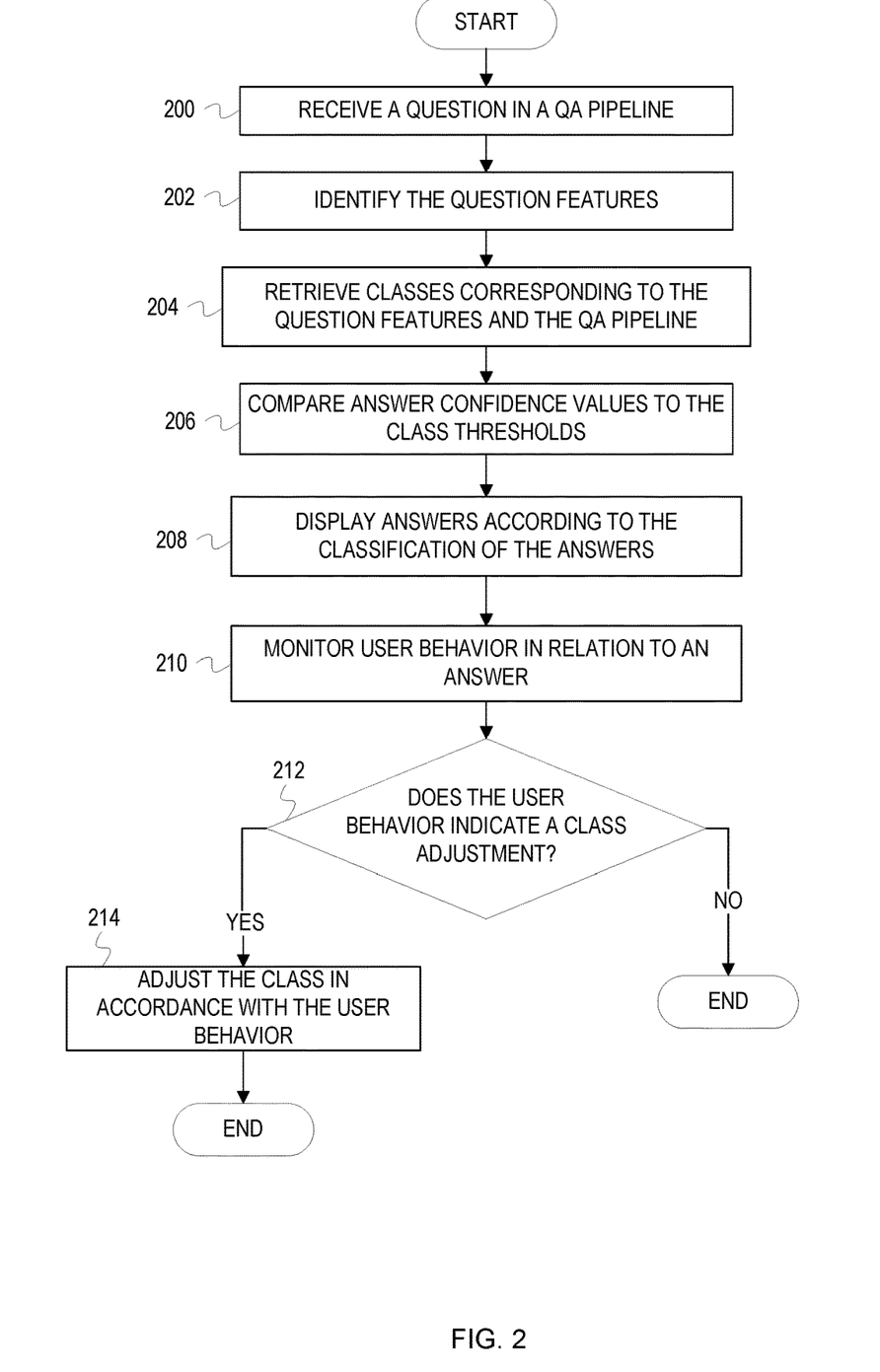
FIG. 2 depicts a flow diagram illustrating example operations for adjusting answer classes based on user behavior.

FIG. 2 depicts a flow diagram illustrating example operations for adjusting answer classes based on user behavior.

At block 200, a question is received by a QA pipeline. Once a query has been received, control then flows to block 202.

At block 202, question attributes are identified. As described above, examples of question attributes include the question classification, the LAT, and the focus. The question attributes are identified using natural language processing, which may be performed by the QA pipeline or by a separate module of a QA system. Once the question attributes are identified, control then flows to block 204.

At block 204, classes corresponding to the question attributes and the QA pipeline are retrieved. Classes may be retrieved from a database where they are stored or they may reside locally in storage. Each QA pipeline has a different set of classes unique to the pipeline. Similarly, each set of question attributes may have its own unique classes. Classes may be retrieved by identifying the set of classes that correspond to the QA pipeline and the question attributes. Also, classes may be stored in a database and be retrieved by querying the database. Once the classes are retrieved, control then flows to block 206.

At block 206, answer confidence values are compared to the class thresholds. As mentioned in the FIG. 1 description, classes have thresholds for classifying answers by their answer confidence values into a class. The answers may be classified according to the class thresholds by the QA pipeline or by another module of a QA system. Once the answers are classified, control then flows to block 208.

At block 208, answers are displayed according to the classification of the answers. Classes have rules that dictate how answers in the class should be displayed. As mentioned above in the FIG. 1 description, a class rule may be to display answers in the class, to make answers available to view, or to not display answers. The answers may be displayed through an interface that is part of a QA system, or the answers may be sent to an external client interface, such as a web page or mobile device. Once the answers have been displayed, control then flows to block 210.

At block 210, user behavior related to an answer is monitored. The interface through which the answers are displayed allows a user to rate, rank, or give feedback for the answers. By monitoring the behavior, a QA system can determine if a response to a returned answer is positive or negative. Additionally, by performing language processing on user feedback, a QA system can determine if an answer is useful in some manner, so even if an answer receives a negative rating, the feedback may indicate that the answer should still be displayed. After user behavior has been monitored, control then flows to block 212.

At block 212, it is determined whether the user behavior indicates a class adjustment. The user responses determined at block 210 indicate whether to adjust a class. For example, if a positive response to an answer that is not displayed is indicated, the class may be adjusted to automatically display answers with similar confidence values in the future. Conversely, if a negative response to an answer that is already not displayed automatically is indicated, the class may not be adjusted. If the user behavior does not indicate a class adjustment, the process ends. If the user behavior does indicate a class adjustment, control then flows to block 214.

At block 214, the class is adjusted in accordance with the user behavior. A class may be adjusted by changing the class threshold. For example, a class threshold may be "if >80, display answer," but if the user behavior indicates that answers with confidence values of 70 or greater are receiving a positive user response, then the class threshold may be adjusted to "if >70, display answer." A class may also be adjusted by changing the class rule. For example, a class rule may be "if >75, display answer." If a positive response is indicated only after a user has viewed evidence for an answer, the class rule of "display answer" may be changed to "display answer and answer evidence." The adjusted class may be stored wherever the original class is located, a database, local storage, etc. The adjusted class will replace the existing class so that the adjusted class will be selected in the future for questions with a same set of attributes. Once the class has been adjusted, the process ends.

Figure 3:
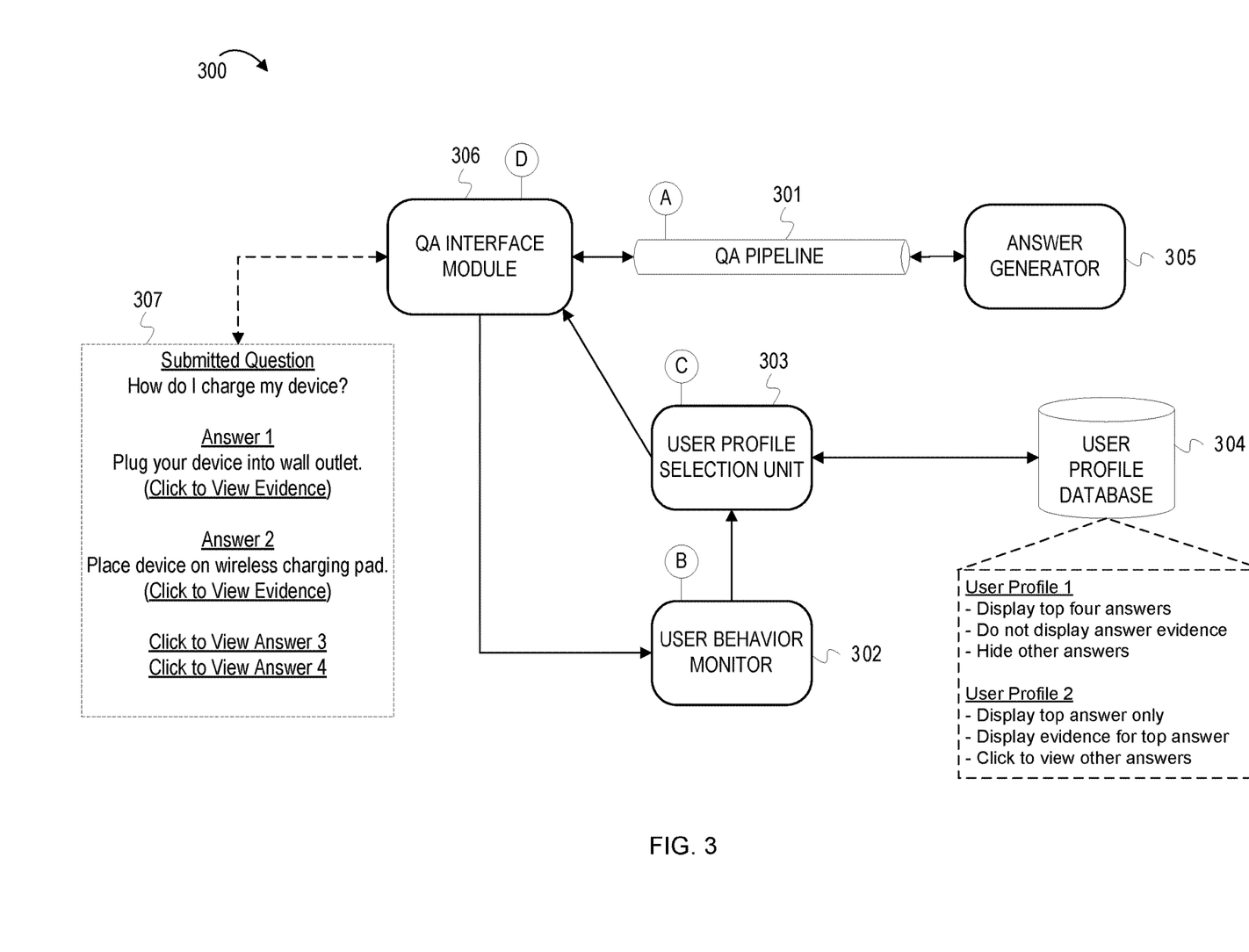
FIG. 3 is a conceptual diagram illustrating a QA system that analyzes user behavior to determine a user profile.

FIG. 3 is a conceptual diagram illustrating a QA system that analyzes user behavior to determine a user profile. FIG. 3 depicts a QA system 300 that includes a QA pipeline 301, a user behavior monitor 302, a user profile selection unit 303, an answer generator 305, and a QA interface module 306. The user profile selection unit 103 communicates with a user profile database 304. QA interface module 306 outputs a sample user interface 307. FIG. 3 depicts a series of stages A-D. These stages illustrate example operations and should not be used to limit scope of any claims.

At stage A, the QA pipeline 301 ("pipeline 301") receives a question and returns possible answers. The pipeline 301 receives a question through the QA interface module 306 ("interface module 306"). The pipeline 301 sends the question to the answer generator 305, which determines answers and returns a set of possible answers to the pipeline 301. The pipeline 301 then returns the answers to the interface module 306. The interface module 306 sends the answers to be displayed by user interface 307.

At stage B, the user behavior monitor 302 ("monitor 302") receives user behavior data through the interface module 306. The monitor 302 tracks user activity and feedback conducted within the user interface 307. For example, the monitor 302 tracks when a user clicks to view answers that are not displayed or clicks to view the evidence for an answer. Additionally, in more complex interfaces, the monitor 307 may also track user comments and user ratings for answers. The monitor 302 tracks a user throughout a session with the QA system 300 and provides the user behavior data to the user profile selection unit 303 ("selection unit 303").

At stage C, the selection unit 303 selects a user profile based on the user behavior data. The selection unit 303 analyzes the user behavior data to identify patterns that indicate a specific user profile. For example, the selection unit 303 may determine that a user consistently views only the top answer and the evidence for the top answer. Based on this behavior pattern, the selection unit 304 retrieves an appropriate user profile (e.g., "User Profile 2") from the user profile database 304. "User Profile 2" provides that only the top answer be displayed, answer evidence for the top answer be displayed, and other answers be hidden until clicked. After retrieving the user profile from the user profile database 304, the selection unit 303 sends the user profile to the interface module 306.

At stage D, the interface module 306 updates the user interface 307 based on the user profile. The interface module 306 may by default use a standard profile for all users, so by updating the user profile, the user interface 307 becomes tailored to the current user's behavior pattern. Upon the next question submitted by the current user, the interface module 306 will cause the returned answers to be displayed by the user interface 307 according to the selected user profile. The user interface 307 for other users will not be affected by the selection of a user profile for the current user. However, a user profile specific to the pipeline 301 may be selected, which would affect all users of the specific pipeline 301.

Figure 4:
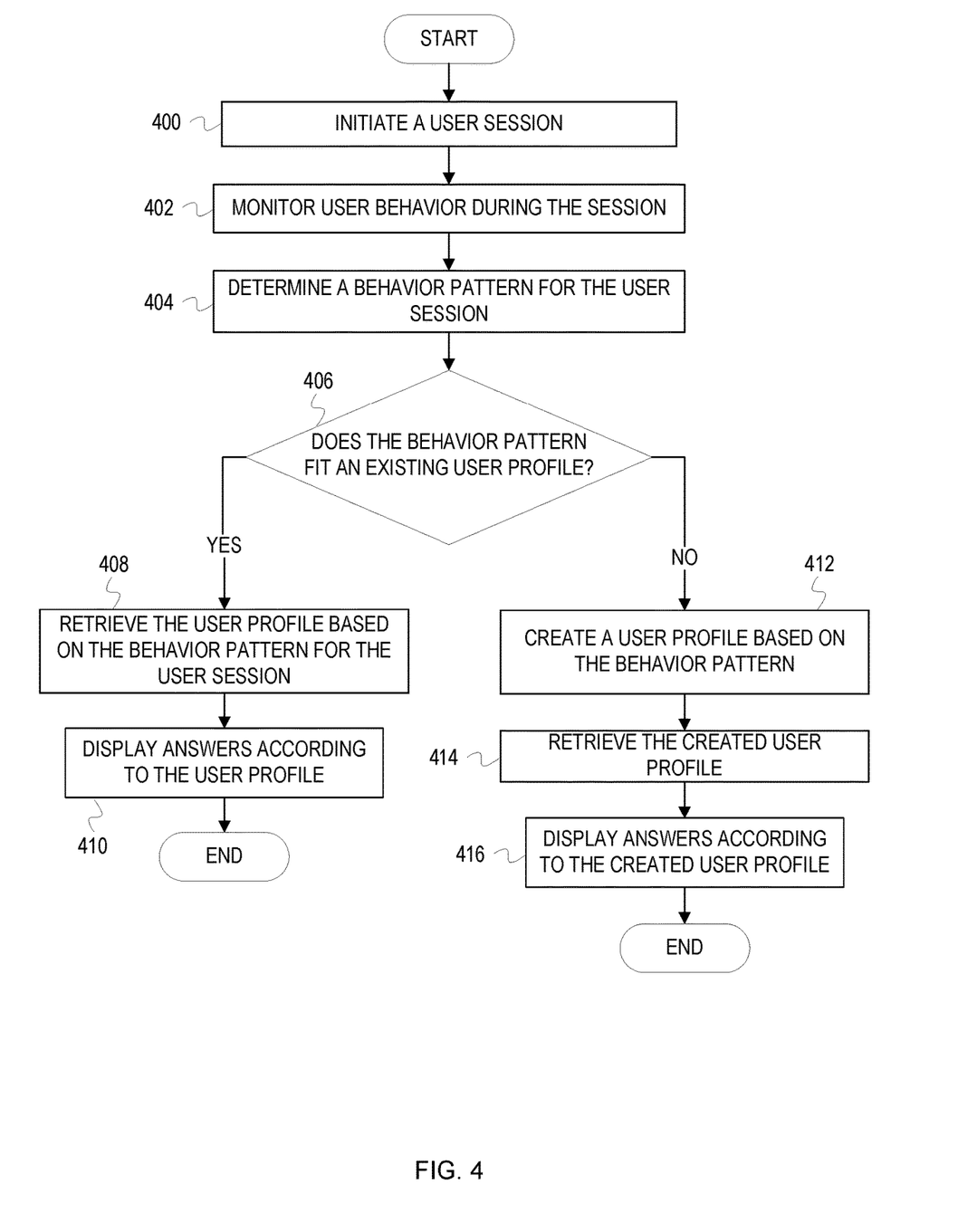
FIG. 4 depicts a flow diagram illustrating example operations for selecting a user profile based on user behavior.

FIG. 4 depicts a flow diagram illustrating example operations for selecting a user profile based on user behavior.

At block 400, a user session is initiated. A user session is a period in which a specific user interacts with a QA system. A session may be as long as a user is continuously interacting with the QA system, may be a specific length of time, or may span each time a specific user interacts with the QA system. Once a user session is initiated, control then flows to block 402.

At block 402, user behavior during the session is monitored. User behavior may include whether a user opts to view non-displayed answers, ignores displayed answers, clicks to view answer evidence, or gives a positive or negative response to answers of certain confidence values. The monitored behavior is collected into user behavior data. Once the user behavior data is determined, control then flows to block 404.

At block 404, a behavior pattern for the user session is determined. A behavior pattern is determined as described above in the FIG. 3 description. After the user behavior pattern is determined, control then flows to block 406.

At block 406, it is determined whether the user behavior pattern fits an existing user profile. Existing user profiles may be stored in a remote database or may be stored locally. A user profile can be identified by comparing attributes of the user behavior pattern with attributes of the stored user profiles. For example, the user behavior pattern may indicate that a user consistently views the top five answers and the answer evidence for those answers. An existing user profile may have the attributes of automatically displaying the top five answers and the answer evidence for those answers. If the behavior pattern does not fit an existing user profile, control then flows to block 412. If the behavior pattern does fit an existing user profile, control then flows to block 408.

At block 408, the existing user profile based on the behavior pattern is retrieved. The existing user profile is selected and retrieved from its storage location. After the user profile is retrieved, control then flows to block 410.

At block 410, answers are displayed according to the user profile. The interface which displays the answers is updated to display the answer according to the retrieved user profile. The interface displaying the answers may be reconfigured in order to display answer according to the attributes of the user profile. Once the answers have been displayed according to the user profile, the process ends.

Control flowed to block 412 if, at block 406, it was determined that the behavior pattern does not fit an existing user profile. At block 412, a user profile with attributes of the user behavior pattern is created. The new user profile may be stored in a remote or local database for future use by the QA system. After the user profile is created, control then flows to block 414.

At block 414, the created user profile is retrieved. The created user profile is retrieved for use by the QA system. After the created user profile is retrieved, control then flows to block 416.

At block 416, answers are displayed according to the created user profile. The interface which displays the answers is updated to display the answer according to the created user profile. The interface displaying the answers may be reconfigured in order to display answer according to the attributes of the created user profile. Once the answers have been displayed according to the created user profile, the process ends.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
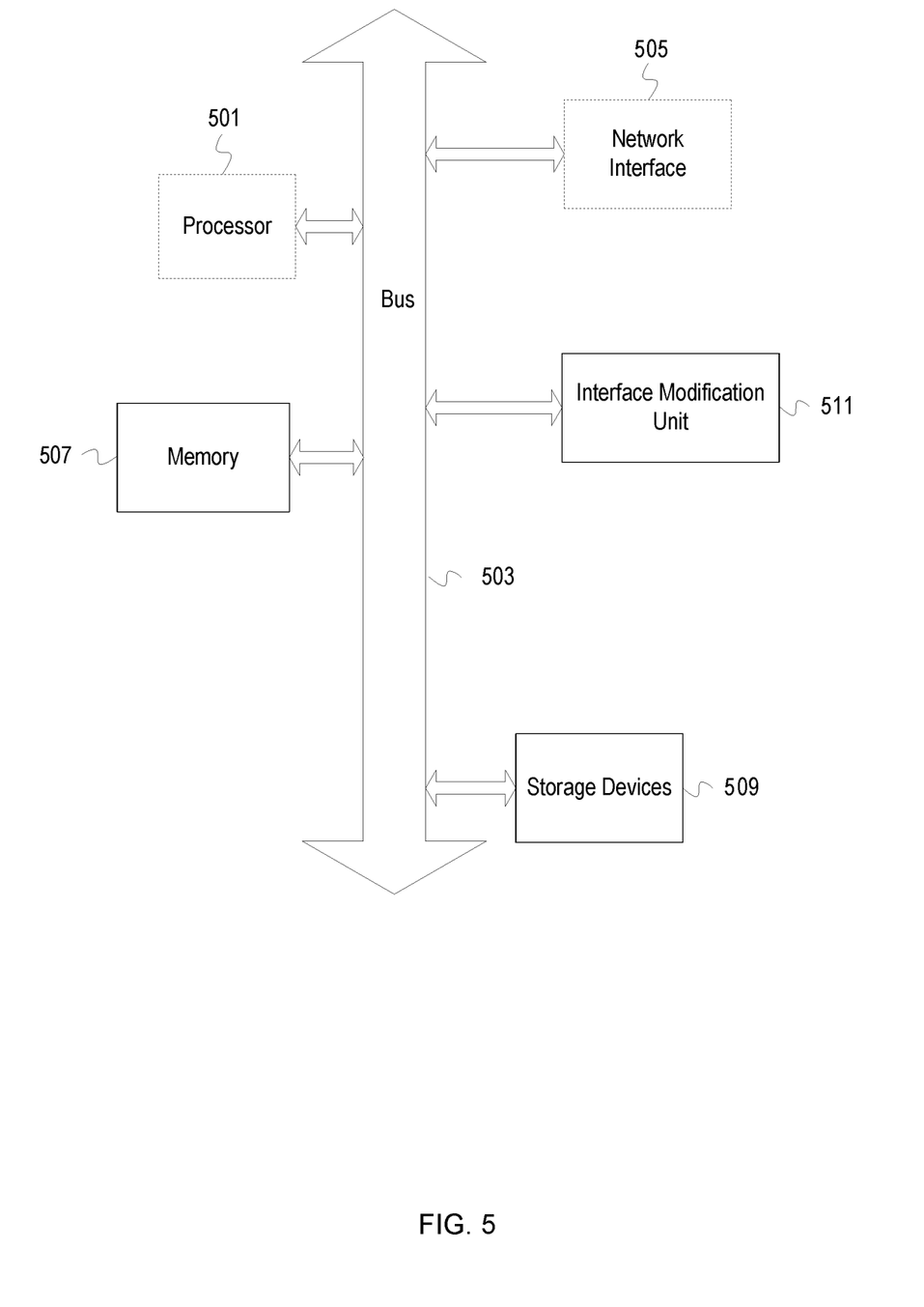
FIG. 5 depicts an example computer system with an interface modification unit.

FIG. 5 depicts an example computer system with an interface modification unit. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The interface modification unit 511 embodies functionality to modify an interface based on answer classes and user profiles. The interface modification unit 511 may adjust an interface based on the classification of answers into classes and associated class rules, based on the selection of a user profile, or a combination of answer classifications and user profiles. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for displaying answers based on answer classes and user profiles as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method for providing answers in a computerized answering system to client devices of a network, comprising:
    initiating, by a processor of the computerized answering system, a user session for a client device;
    providing, by a network interface of the computerized answering system via the network, answers to one or more questions for presentation in a user interface of a display of the client device, the presentation of the answers being based on a default profile;
    monitoring, by the processor, user interaction with one or more of the answers presented in the user interface of the display of the client device during the user session, wherein the user interaction is selected from the group consisting of:
        a user-selected rating for the one or more of the answers,
        a user comment about the one or more of the answers, and
        a user selection to view a non-displayed answer;
    selecting, by the processor, a first user profile from a plurality of user profiles in response to determining attributes of the user interaction correspond to attributes of the first user profile; and
    modifying, by the processor, the user interface of the display of the client device to change from presenting the answers based on the default profile to presenting the answers based on the first user profile.

2. The method of claim 1, wherein monitoring user interaction includes monitoring user activity and feedback conducted within the user interface during the user session.

3. The method of claim 2, further comprising:
    determining a user behavior pattern based on the user activity and feedback conducted within the user interface during the user session, wherein determining attributes of the user interaction includes determining attributes of the user behavior pattern.

4. The method of claim 1, wherein the attributes of the first user profile comprises at least one of:
an indication that only a specified number of answers be displayed;
an indication that only answers with a certain confidence value be displayed; or
an indication that evidence for answers be displayed.

5. The method of claim 1, further comprising:
receiving, by the network interface of the computerized answering system, a new question for the computerized answering system from the client device;
generating one or more answers to the new question; and
presenting the one or more answers to the new question in the user interface of the display of the client device based on the first user profile.

6. The method of claim 1, further comprising:
in response to determining attributes of the user interaction do not correspond to any of the plurality of user profiles,
creating a new user profile based on the attributes of the user interaction; and
modifying the user interface to change from presenting the answers based on the default profile to presenting the answers based on the new user profile.

7. The method of claim 1, wherein the plurality of profiles are stored in a remote database or locally in the computerized answering system.

8. The method of claim 1, wherein modifying the user interface of the display of the client device to change from presenting the answers based on the default profile to presenting the answers based on the first user profile based on the user interaction does not modify the user interfaces of other user sessions associated with other client devices of the network.

9. A computer program product for providing answers in a computerized answering system to client devices of a network, comprising:
a non-transitory computer readable storage medium having program instructions embodied therewith, the program instructions comprising program instructions to,
initiate, by a processor of the computerized answering system, a user session for a client device;
provide, by a network interface of the computerized answering system via the network, answers to one or more questions for presentation in a user interface of a display of the client device, the presentation of the answers being based on a default profile;
monitor, by the processor, user interaction with one or more of the answers presented in the user interface of the display of the client device during the user session,
wherein monitoring user interaction further includes monitoring user activity and feedback conducted within the user interface during the user session, the feedback selected from the group consisting of a user-selected rating for the one or more of the answers and a user comment about the one or more of the answers;
select, by the processor, a first user profile from a plurality of user profiles in response to a determination that attributes of the user interaction correspond to attributes of the first user profile; and
modify, by the processor, the user interface of the display of the client device to change from presenting the answers based on the default profile to presenting the answers based on the first user profile.

10. The computer program product of claim 9, further having program instructions to:
determine a user behavior pattern based on the user activity and feedback conducted within the user interface during the user session,
wherein the program instructions to determine attributes of the user interaction include program instructions to determine attributes of the user behavior pattern.

11. The computer program product of claim 9, wherein the attributes of the first user profile comprises at least one of:
an indication that only a specified number of answers be displayed;
an indication that only answers with a certain confidence value be displayed; or
an indication that evidence for answers be displayed.

12. The computer program product of claim 9, further having program instructions to:
receive, by the network interface of the computerized answering system, a new question for the computerized answering system from the client device;
generate one or more answers to the new question; and
present the one or more answers to the new question in the user interface of the display of the client device based on the first user profile.

13. The computer program product of claim 9, further having program instructions to:
in response to a determination that the attributes of the user interaction do not correspond to any of the plurality of user profiles,
create a new user profile based on the attributes of the user interaction; and
modify the user interface to change from presenting the answers based on the default profile to presenting the answers based on the new user profile.

14. A server for implementing a computerized answering system for providing answers to client devices of a network, comprising:
a processor;
a network interface; and
a computer readable storage medium having program instructions embodied therewith, the program instructions executable by the processor to cause the server to:
initiate a user session for a client device;
provide answers to one or more questions for presentation in a user interface of a display of the client device, the presentation of the answers being based on a default profile;
monitor user interaction with one or more of the answers presented in the user interface of the display of the client device during the user session,
wherein monitoring user interaction includes monitoring user activity and feedback conducted within the user interface during the user session, the feedback selected from the group consisting of a user-selected rating for the one or more of the answers and a user comment about the one or more of the answers;
select, a first user profile from a plurality of user profiles in response to a determination that attributes of the user interaction correspond to attributes of the first user profile,
wherein the attributes of the first user profile are selected from the group consisting of:
an indication that only a specified number of answers be displayed,
an indication that only answers with a certain confidence value be displayed, and
an indication that evidence for answers be displayed;

modify the user interface of the display of the client device to change from presenting the answers based on the default profile to presenting the answers based on the first user profile;

receive a new question for the computerized answering system from the client device;

generate one or more answers to the new question; and present the one or more answers to the new question in the user interface of the display of the client device based on the first user profile.

15. The server of claim 14, further having program instructions executable by the processor to cause the server to:

in response to a determination that the attributes of the user interaction do not correspond to any of the plurality of user profiles, create a new user profile based on the attributes of the user interaction; and modify the user interface to change from presenting the answers based on the default profile to presenting the answers based on the new user profile.

\* \* \* \* \*